(12) United States Patent
Bertz et al.

(10) Patent No.: US 9,031,498 B1
(45) Date of Patent: May 12, 2015

(54) AUTOMOTIVE MULTI-GENERATION CONNECTIVITY

(75) Inventors: Lyle T. Bertz, Lee's Summit, MO (US); Jason R. Delker, Olathe, KS (US); Matthew Oommen, Overland Park, KS (US); Trevor D. Shipley, Olathe, KS (US)

(73) Assignee: Sprint Communications Company L.P., Overland Park, KS (US)

( * ) Notice: Subject to any disclaimer, the term of this patent is extended or adjusted under 35 U.S.C. 154(b) by 970 days.

(21) Appl. No.: 13/094,494

(22) Filed: Apr. 26, 2011

(51) Int. Cl.
*H04B 7/185* (2006.01)
*H04W 72/04* (2009.01)

(52) U.S. Cl.
CPC ..................... *H04W 72/04* (2013.01)

(58) Field of Classification Search
USPC ........ 455/445, 11.1, 13.1, 41.2, 552.1, 553.1, 455/556.1, 560, 561, 569.1, 569.2, 67.11, 455/67.13, 3.05, 3.06; 340/539.1, 340/539.11–539.29
See application file for complete search history.

(56) References Cited

U.S. PATENT DOCUMENTS

| | | | |
|---|---|---|---|
| 6,622,083 B1 | 9/2003 | Knockeart et al. | |
| 7,209,964 B2 | 4/2007 | Dugan et al. | |
| 7,366,892 B2 | 4/2008 | Spaur et al. | |
| 7,376,392 B2 | 5/2008 | Myojo | |
| 7,454,473 B2 | 11/2008 | Suzuki | |
| 7,912,224 B2 | 3/2011 | Lee et al. | |
| 7,949,375 B2 * | 5/2011 | Kortge | 455/569.2 |
| 7,966,111 B2 | 6/2011 | Moinzadeh et al. | |
| 8,271,050 B2 * | 9/2012 | Weiss | 455/569.2 |
| 8,457,686 B2 | 6/2013 | Przybylski | |
| 8,484,707 B1 | 7/2013 | Bertz et al. | |
| 8,527,164 B2 | 9/2013 | Staudinger et al. | |
| 8,548,532 B1 | 10/2013 | Ng | |
| 8,606,335 B2 * | 12/2013 | Ozaki | 455/569.2 |

(Continued)

FOREIGN PATENT DOCUMENTS

| | | |
|---|---|---|
| DE | 102011112546 A1 | 4/2014 |
| JP | 20062441 A | 9/2006 |

(Continued)

OTHER PUBLICATIONS

Office Action dated Feb. 5, 2014, U.S. Appl. No. 13/218,503, filed Aug. 26, 2011.

(Continued)

*Primary Examiner* — Tuan A Tran (57) ABSTRACT

A processor-implemented method is provided. The method comprises a communications control device installed in a motor vehicle receiving a wireless communication from a short range wireless device. The method also comprises the communications control device selecting a first radio from a plurality of radios available to transmit the wireless communication to the destination specified in the wireless communication, wherein the radios are components of the communications control device. The method also comprises the communications control device determining that a second radio is connected to a physical expansion slot, wherein the physical expansion slot is a component of the communications control device. The method also comprises the communications control device selecting the second radio for transmission of the wireless communication based on applying at least one decision criterion to the first radio and the second radio and the device transmitting the wireless communication to the specified destination using the second radio.

19 Claims, 7 Drawing Sheets

(56) References Cited

U.S. PATENT DOCUMENTS

| | | | |
|---|---|---|---|
| 8,626,152 B2* | 1/2014 | Farrell et al. | 455/426.1 |
| 8,630,747 B2 | 1/2014 | Burcham et al. | |
| 8,676,199 B2* | 3/2014 | Madhavan et al. | 455/435.2 |
| 8,750,942 B1 | 6/2014 | Ng | |
| 8,787,949 B2 | 7/2014 | Sumcad et al. | |
| 2003/0096641 A1 | 5/2003 | Odinak | |
| 2003/0120601 A1 | 6/2003 | Ouye et al. | |
| 2003/0224840 A1 | 12/2003 | Frank et al. | |
| 2004/0125957 A1 | 7/2004 | Rauber et al. | |
| 2004/0157650 A1* | 8/2004 | Wissinger et al. | 455/569.2 |
| 2005/0021744 A1 | 1/2005 | Haitsuka et al. | |
| 2005/0065779 A1 | 3/2005 | Odinak | |
| 2005/0113102 A1 | 5/2005 | Kwon et al. | |
| 2007/0113269 A1 | 5/2007 | Zhang | |
| 2007/0124043 A1 | 5/2007 | Ayoub et al. | |
| 2007/0124045 A1 | 5/2007 | Ayoub et al. | |
| 2007/0124046 A1 | 5/2007 | Ayoub et al. | |
| 2007/0160199 A1 | 7/2007 | Sekiguchi et al. | |
| 2008/0034126 A1 | 2/2008 | Baker | |
| 2008/0072047 A1 | 3/2008 | Sarikaya et al. | |
| 2008/0148374 A1 | 6/2008 | Spaur et al. | |
| 2008/0289044 A1 | 11/2008 | Choi | |
| 2008/0307086 A1 | 12/2008 | Brooks et al. | |
| 2009/0028082 A1 | 1/2009 | Wynn et al. | |
| 2009/0049119 A1 | 2/2009 | Marcinkiewicz et al. | |
| 2009/0109941 A1 | 4/2009 | Carter | |
| 2009/0217036 A1 | 8/2009 | Irwin et al. | |
| 2010/0097239 A1 | 4/2010 | Campbell et al. | |
| 2010/0136944 A1 | 6/2010 | Taylor et al. | |
| 2010/0197362 A1 | 8/2010 | Saitoh et al. | |
| 2010/0220250 A1 | 9/2010 | Vanderwall et al. | |
| 2010/0234071 A1* | 9/2010 | Shabtay et al. | 455/562.1 |
| 2010/0235285 A1 | 9/2010 | Hoffberg | |
| 2010/0260350 A1 | 10/2010 | Chutorash et al. | |
| 2011/0099316 A1 | 4/2011 | Tseng et al. | |
| 2011/0257973 A1 | 10/2011 | Chutorash et al. | |
| 2011/0263293 A1 | 10/2011 | Blake et al. | |
| 2011/0295444 A1 | 12/2011 | Westra et al. | |
| 2011/0310731 A1 | 12/2011 | Park et al. | |
| 2012/0109406 A1 | 5/2012 | Yousefi et al. | |
| 2012/0134497 A1 | 5/2012 | Roitshtein et al. | |
| 2012/0159638 A1 | 6/2012 | McDade, Sr. | |
| 2012/0183221 A1 | 7/2012 | Alasry et al. | |
| 2012/0203557 A1 | 8/2012 | Odinak | |
| 2012/0282895 A1 | 11/2012 | Bai et al. | |
| 2012/0324046 A1 | 12/2012 | Park | |
| 2013/0205026 A1 | 8/2013 | Ricci | |
| 2013/0226391 A1 | 8/2013 | Nordbruch et al. | |
| 2013/0297456 A1 | 11/2013 | Annan et al. | |
| 2014/0068010 A1 | 3/2014 | Nicholson et al. | |
| 2014/0087760 A1 | 3/2014 | Bennett | |
| 2014/0222298 A1 | 8/2014 | Gurin | |

FOREIGN PATENT DOCUMENTS

| | | |
|---|---|---|
| WO | 2013166418 A2 | 11/2013 |
| WO | 2013173331 A1 | 11/2013 |

OTHER PUBLICATIONS

Ng, Sei Y., Patent Application entitled "Head Unit to Handset Interface and Integration," filed Aug. 20, 2013, U.S. Appl. No. 13/971,658.

Bloomcamp, Eric M., et al., Patent Application entitled Authenticating Mobile Device for on Board Diagnostic System Access, filed Sep. 23, 2013, U.S. Appl. No. 14/034,475.

Advisory Action dated Aug. 1, 2013, U.S. Appl. No. 13/218,503, filed Aug. 26, 2011.

Notice of Allowance dated Aug. 26, 2013, U.S. Appl. No. 13/471,107, filed May 14, 2012.

First Action Interview Pre-Communication dated Aug. 21, 2012, U.S. Appl. No. 13/218,503, filed Aug. 26, 2011.

First Action Interview Office Action dated Jan. 3, 2013, U.S. Appl. No. 13/218,503, filed Aug. 26, 2011.

Final Office Action dated May 7, 2013, U.S. Appl. No. 13/218,503, filed Aug. 26, 2011.

First Action Interview Pre-Interview Communication dated Oct. 26, 2012, U.S. Appl. No. 13/156,438, filed Jun. 9, 2011.

Notice of Allowance dated Feb. 26, 2013, U.S. Appl. No. 13/156,438, filed Jun. 9, 2011.

First Action Interview Pre-Communication dated Jan. 31, 2012, U.S. Appl. No. 13/246,554, filed Sep. 27, 2011.

Faipp Office Action dated May 21, 2012, U.S. Appl. No. 13/246,554, filed Sep. 27, 2011.

Final Office Action dated Sep. 5, 2012, U.S. Appl. No. 13/246,554, filed Sep. 27, 2011.

Advisory Action dated Nov. 2, 2012, U.S. Appl. No. 13/246,554, filed Sep. 27, 2011.

Office Action dated Dec. 5, 2012, U.S. Appl. No. 13/246,554, filed Sep. 27, 2011.

Notice of Allowance dated May 20, 2013, U.S. Appl. No. 13/246,554, filed Sep. 27, 2011.

Office Action dated Mar. 13, 2013, U.S. Appl. No. 13/471,107, filed May 14, 2012.

Aboda, B., et al., "Exentsible Authentication Protocol (EAP)", Network Working Group, RFC 3748, Standards Track, Jun. 2004.

Shipley, Trevor D., et al. Patent Application entitled "Mobile Communication System Identity Pairing," filed Aug. 26, 2011, U.S. Appl. No. 13/218,503.

Bertz, Lyle T., et al., Patent Application entitled "Secure Changing Auto-Generated Keys for Wireless Access," filed Jun. 9, 2011, U.S. Appl. No. 13/156,438.

Ng, Sei Y., Patent Application entitled "Head Unit to Handset Interface and Integration," filed Sep. 27, 2011, U.S. Appl. No. 13/246,554.

Annan, Brandon C., et al. Patent Application entitled "Methods and Systems of Digital Rights Management for Vehicles," filed May 3, 2012, U.S. Appl. No. 13/463,799.

Burcham, Robert H., et al. Patent Application entitled "In-car Head unit Wireless Communication Service Subscription Initialization," filed Apr. 24, 2012, U.S. Appl. No. 13/455,121.

Burcham, Robert H., et al. Patent Application entitled "Alternative Authorization for Telematics," filed May 14, 2012, U.S. Appl. No. 13/471,107.

Bloomcamp, Eric Michael, et al. Patent Application entitled "Dual Path In-Vehicle Communication," filed Feb. 15, 2012, U.S. Appl. No. 13/769,268.

Bonn, Michael J., et al. Patent Application entitled "System and Method of Utilizing Driving Profiles via a Mobile Device," filed Mar. 15, 2012, U.S. Appl. No. 13/844,226.

Final Office Action dated Jun. 16, 2014, U.S. Appl. No. 13/218,503, filed Aug. 26, 2011.

Foreign Communication From a Related Counterpart Application, International Search Report and Written Opinion dated Jun. 13, 2013, International Application No. PCT/US13/40940 filed on May 14, 2013.

Foreign Communication From a Related Counterpart Application, International Search Report and Written Opinion dated Dec. 23, 2013, International Application No. PCT/US13/39514 filed on May 3, 2013.

First Action Interview Pre-Communication dated Nov. 15, 2013, U.S. Appl. No. 13/791,658, filed Aug. 20, 2013.

Notice of Allowance dated Jan. 30, 2014, U.S. Appl. No. 13/791,658, filed Aug. 20, 2013.

Advisory Action dated Sep. 26, 2014, U.S. Appl. No. 13/218,503, filed Aug. 26, 2011.

Office Action dated Aug. 12, 2014, U.S. Appl. No. 13/769,268, filed Feb. 15, 2013.

Office Action dated Jul. 14, 2014, U.S. Appl. No. 13/661,536, filed Oct. 26, 2012.

Hohler, Rick A., et al., Patent Application entitled "Provisioning Vehicle based Digital Rights Management for Media Delivered via Phone," filed Oct. 26, 2012, U.S. Appl. No. 13/662,536.

Finnerty, Brian J., et al., Patent Application entitled "Method for Authenticating Driver for Registration of In-Vehicle Telematics Unit," filed Oct. 31, 2014, U.S. Appl. No. 14/530,667.

(56) References Cited

OTHER PUBLICATIONS

Foreign Communication From a Related Counterpart Application, International Preliminary Report on Patentability dated Nov. 13, 2014, PCT/US13/39514 filed on May 3, 2013.
Foreign Communication From a Related Counterpart Application, International Preliminary Report on Patentability dated Nov. 27, 2014, PCT/US13/40940 filed on May 14, 2013.

First Action Interview Pre-Communication dated Dec. 1, 2014, U.S. Appl. No. 13/844,226, filed on Mar. 15, 2013.
Notice of Allowance dated Jan. 6, 2015, U.S. Appl. No. 13/661,536, filed on Oct. 26, 2012.
Supplemental Notice of Allowance dated Jan. 30, 2015, U.S. Appl. No. 13/661,536, filed on Oct. 26, 2012.

* cited by examiner

AUTOMOTIVE MULTI-GENERATION CONNECTIVITY

CROSS-REFERENCE TO RELATED APPLICATIONS

None.

STATEMENT REGARDING FEDERALLY SPONSORED RESEARCH OR DEVELOPMENT

Not applicable.

REFERENCE TO A MICROFICHE APPENDIX

Not applicable.

BACKGROUND

Electronic devices used by a driver and passengers in a motor vehicle may comprise a plurality of hardware devices that provide audio and/or audio/visual entertainment as well as automotive navigation systems. These devices may comprise compact disk (CD) players, digital video disk (DVD) players, global positioning system (GPS) navigation devices, video game consoles, televisions, and surround sound systems. Some computers may be designed to operate in a motor vehicle environment. Such specially adapted computers may provide many functions, such as video and audio playback, games and internet connectivity. Electronic devices in motor vehicles may become more widely available due to reduced costs of devices such as liquid crystal display (LCD) screens and monitors and the falling cost to the consumer of the media content itself such as movies and music. Problems encountered in the use of entertainment and other electronic devices in motor vehicles include the availability of electric power since computers, game consoles, and other devices are designed to operate from the main power supply of the motor vehicle. Additional problems include theft of electronic devices from motor vehicles and damage to motor vehicles resulting from such theft.

SUMMARY

In an embodiment, a processor-implemented method is provided. The method comprises a communications control device installed in a motor vehicle receiving a wireless communication from a short range wireless device. The method also comprises the communications control device selecting a first radio from a plurality of radios available to transmit the wireless communication to the destination specified in the wireless communication, wherein the radios are components of the communications control device. The method also comprises the communications control device selecting a second radio for transmission of the wireless communication based on applying at least one decision criterion to the first radio and the second radio. The method also comprises the communications control device transmitting the wireless communication to the specified destination using the second radio.

In an embodiment, a processor-implemented method is provided. The method comprises a communications control device transmitting wireless communications received via a mobile wireless access point to a proximate short range wireless device wherein the communications are received from a remote long range wireless device, wherein the communications control device and the mobile wireless access point are installed in a motor vehicle and wherein the short range wireless device is carried by the motor vehicle. The method also comprises the communications control device detecting that the signal strength of a stationary wireless access point exceeds a predetermined level. The method also comprises the communications control device turning off the mobile wireless access point.

In an embodiment, a processor-implemented method is provided. The method comprises a communications control device installed in a motor vehicle determining a received signal strength of a wireless access point exceeds a predetermined threshold. The method also comprises the communications control device receiving a first wireless communication from the wireless access point. The method also comprises the communications control device determining that the first wireless communication contains a request for information about the motor vehicle. The method also comprises the communications control device sending a second wireless communication to the source of the first wireless communication, the second wireless communication providing the information requested about the motor vehicle.

These and other features will be more clearly understood from the following detailed description taken in conjunction with the accompanying drawings and claims.

BRIEF DESCRIPTION OF THE DRAWINGS

For a more complete understanding of the present disclosure, reference is now made to the following brief description, taken in connection with the accompanying drawings and detailed description, wherein like reference numerals represent like parts.

DETAILED DESCRIPTION

It should be understood at the outset that although illustrative implementations of one or more embodiments are illustrated below, the disclosed systems and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents.

The present disclosure provides a system and methods of automotive multi-generation connectivity that permit a driver or passenger using at least one short range wireless device in a motor vehicle to exchange transmissions with long range wireless devices not in the motor vehicle. A communications control device taught herein comprises a connection manager component and a plurality of on-board radios. One of a plurality of wireless technologies provided by the on-board radios may be selected by the connection manager component to forward the transmissions between short range wireless devices carried in the vehicle and long range wireless devices. The present disclosure additionally teaches that an expansion or express slot may be installed in the motor vehicle. The express slot may accommodate future devices that may be based on wireless technologies that may not be available at the time the communications control device is installed in the motor vehicle. The communications control device may detect the presence of the device held by the express slot, may analyze the technology of the device and other factors, and may determine to use the device instead of any of the on-board radios incorporated into the communications control device.

The communications control device also may detect the presence of the future device that is present in the motor vehicle but that is not held by the express slot, wherein the device communicates either wirelessly or using a wired connection. The communications control device may effectively decide to bypass some of its own on-board technology and use a more advanced device in the motor vehicle either attached to or not attached to the express slot. Devices held by the express slot may connect wirelessly to the communications control device using an established technology known to the device, for example Wi-Fi, and connect with long range devices using future technologies that may not be known at the time the communications control device is installed in the motor vehicle. In an embodiment, the express slot also provides electrical power for held devices as well as physical stability. The present disclosure teaches bridging between an established technology such as Wi-Fi and a future wireless communication technology.

A motor vehicle, for example an automobile, may have a useful life in excess of ten years. During the life of the motor vehicle, wireless devices such as mobile telephones and game consoles may undergo a plurality of technological and generational advances and transformations. A motorist may wish to have state-of-the-art or reasonably current wireless transmission technology in his or her motor vehicle, even if the vehicle is ten or more years old. The present disclosure teaches the use of the express slot to accommodate future devices and teaches the functionality of the communications control device to recognize when a device is held by the express slot by detecting radio transmissions associated with the device. The communications control device also makes a determination whether to use the device or one of the on-board radios and to enable wireless transmissions accordingly. The communications control device and its components may promote the driver and passengers of an older motor vehicle to access communication transmission rates and features of current technologies.

The present disclosure also teaches a Wi-Fi access point provided in the motor vehicle by the communications control device sharing a service set identifier (SSID) with a stationary Wi-Fi access point in a home, office, or shop. When the motor vehicle becomes proximate to the stationary Wi-Fi access point, an increased signal strength associated with the stationary Wi-Fi access point may be detected. In this event, the communications control device may turn off Wi-Fi access point functionality provided in the motor vehicle. Wireless devices in the motor vehicle previously accessing the Wi-Fi access point in the vehicle may begin accessing the stationary Wi-Fi access point. This may occur without interruption of service and without the knowledge of the users of the wireless devices in the motor vehicle. The communications control device effectively causes the Wi-Fi access point in the motor vehicle to yield to the stationary Wi-Fi access point.

Figure 1:
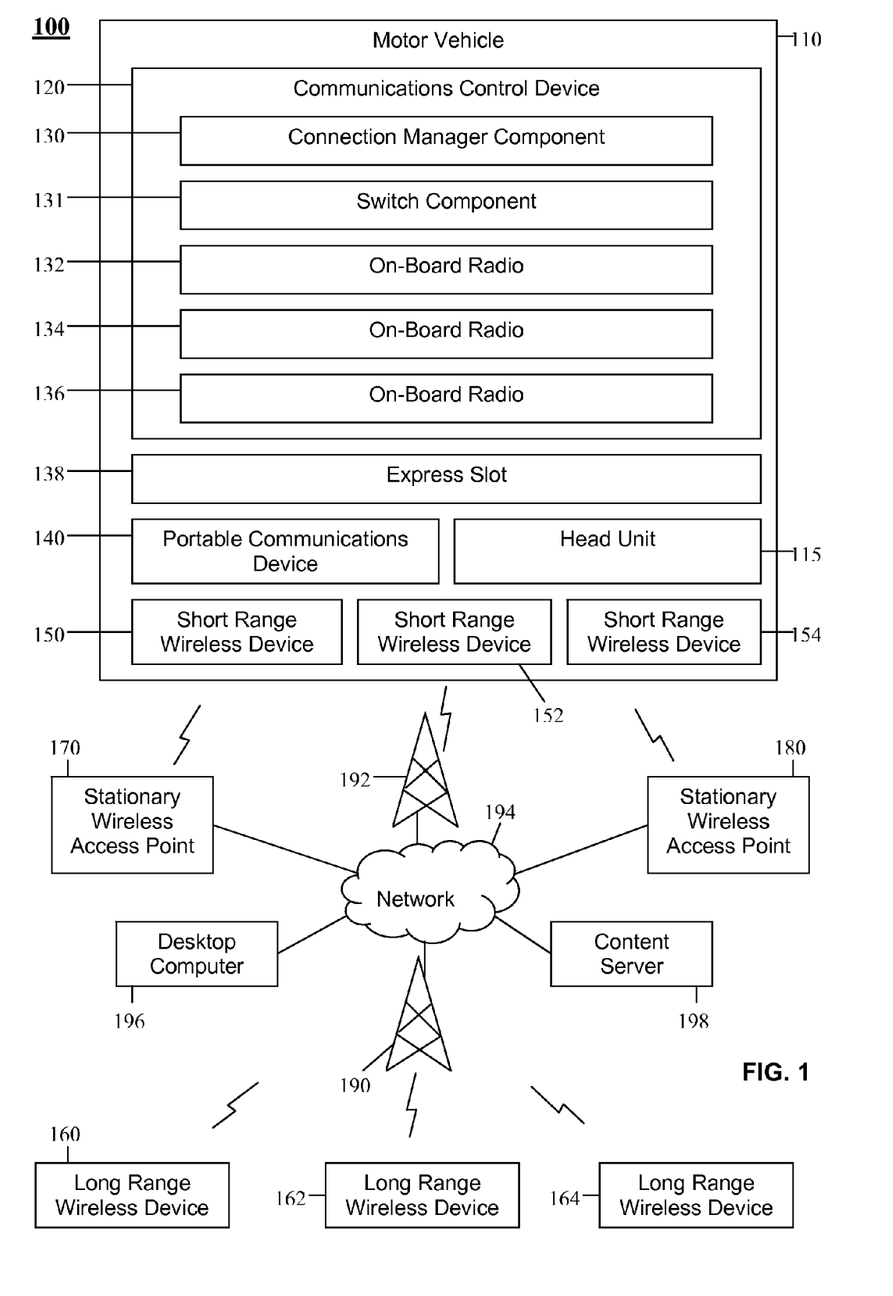
FIG. 1 is a block diagram of a system according to an embodiment of the disclosure.

Turning now to FIG. 1, a system 100 is described. In an embodiment, the system 100 comprises a motor vehicle 110, a communications control device 120, a head unit 115, a connection manager component 130, a switch component 131, on-board radios 132, 134, 136, an express slot 138, a portable communications device 140, and short range wireless devices 150, 152, 154. In an embodiment, the system 100 also comprises long range wireless devices 160, 162, 164, stationary wireless access points 170, 180, base transceiver stations 190, 192, a network 194, a desktop computer 196, and a content server 198. The stationary wireless access point 170 may be referred to as the first stationary wireless access point 170 and the stationary wireless access point 180 may be referred to as the second stationary wireless access point 180.

The motor vehicle 110 comprises one of an automobile, a sport utility vehicle, a van, a light truck, a pickup truck, a commercial truck, a bus, a motorcycle, or other vehicle. The communications control device 120 is installed in the motor vehicle 110 and may receive a plurality of wireless messages from short range wireless devices 150, 152, 154 and long range wireless devices 160, 162, 164. The short range wireless devices 150, 152, 154 may be portable devices and may be physically in or otherwise transported by the motor vehicle 110. The short range wireless devices 150, 152, 154 may have transmissions ranges of about three hundred feet or less. The long range wireless devices 160, 162, 164 may be portable devices and may not be physically in the motor vehicle 110. The long range wireless devices 160, 162, 164 may have transmission ranges of up to two miles, up to five miles, or up to ten miles, for example. The long range wireless devices 160, 162, 164 may use at least one of code division multiple access (CDMA) technology, global system for mobile communications (GSM) technology, worldwide interoperability for microwave access (WiMAX) technology, and long term evolution (LTE) technology for transmission. The communications control device 120 determines when messages received from the short range wireless devices 150, 152, 154 are intended for at least one of the long range wireless devices 160, 162, 164. The communications control device 120 conversely determines when messages received from the long range wireless devices 160, 162, 164 are intended for one of the short range wireless devices 150, 152, 154. The wireless messages may comprise data or voice packets and may comprise electronic mail messages, live or taped voice or other audible content, digital photographs or other images, video content, short message service (SMS) messages, also known as text messages, instant messages (IM), and multimedia messaging service (MMS) messages.

The communications control device 120 comprises the connection manager component 130 that may determine a wireless technology to use in transmitting messages between short range wireless devices 150, 152, 154 and long range wireless devices 160, 162, 164. The connection manager component 130 may analyze the wireless technologies provided by the on-board radios 132, 134, 136. The on-board radios 132, 134, 136 may provide at least one of a Wi-Fi, a Bluetooth, and a 3G connectivity for some transmissions between the short range wireless devices 150, 152, 154 and the long range wireless devices 160, 162, 164. The connection manager component 130 may select one of the on-board radios 132, 134, 136 to use in forwarding transmissions based on the technology to be used as well as other factors.

The on-board radios 132, 134, 136 communicate using technologies such as Wi-Fi, Bluetooth, and 3G but may convert transmissions to a baseband signal when the connection manager component 130 directs that transmissions should pass through the switch component 131. The on-board radios 132, 134, 136 perform encoding and decoding functions. The switch component 131 performs the transfer and forwarding of traffic between the short range wireless devices 150, 152, 154, on-board radios 132, 134, 136, and the long range wireless devices 160, 162, 164. The switch component 131 receives baseband transmissions from on-board radios 132, 134, 136 wherein the transmissions have been converted by the on-board radios 132, 134, 136 from one of Wi-Fi, Bluetooth, and 3G transmissions. The switch component 131 forwards the received baseband transmissions to on-board radios 132, 134, 136 that convert the baseband transmissions to one of Wi-Fi, Bluetooth, and 3G transmissions and forward them to their destinations. The switch component 131 performs these actions at the direction of the connection manager component 130.

The present disclosure also teaches that the motor vehicle 110 also includes the express slot 138. The express slot 138 is a physical interface that may be used for a plurality of different electronic devices over time, for example the portable communications device 140. The portable communications device 140 may at a future date use a technology that may not be in service or may not exist at the time the communications control device 120 is installed into the motor vehicle 110. While the on-board radios 132, 134, 136 may use current technologies such as Bluetooth, Wi-Fi, and 3G, subsequent to the installation of the communications control device 120 in the motor vehicle 110, devices such as the portable communications device 140 that use more advanced technologies may become available. The express slot 138 may provide at least one data connection for currently released as well as future devices. The data connection may be wireless and/or may provide a physical structure that may accommodate future devices of designs and technologies not known at the time the communications control device 120 is installed into the motor vehicle 110. In an embodiment, the express slot 138 also may supply electric power to the portable communications device 140 installed into it as well as provide physical stability for the portable communications device 140.

The express slot 138 may prevent the portable communications device 140 from being knocked loose should the motor vehicle 110 encounter rough pavement or terrain, for example. This may prevent the portable communications device 140 from suffering damage if it is jarred loose and falls to the floor of the motor vehicle 110 whereupon a passenger may accidentally step on the portable communications device 140 or knock the portable communications device 140 out of the motor vehicle 110. This also may prevent the portable communications device 140 from being lost beneath a seat of the motor vehicle 110. The connection manager component 130 may periodically monitor the express slot 138 for transmission of Wi-Fi signals. When the connection manager component 130 detects that the portable communications device 140 is installed there, the connection manager component 130 may evaluate the technology of the portable communications device 140.

The connection manager component 130 may compare the technology of the portable communications device 140 with the technologies provided by the on-board radios 132, 134, 136 to determine whether to use the portable communications device 140 or one of the on-board radios 132, 134, 136 to forward a transmission. The connection manager component 130 also may evaluate other factors such as signal strength and clarity as well as non-technical factors such as cost or revenue potential of using the various available transmission technologies. The connection manager component 130 evaluating the technology of the portable communications device 140 when connected to the express slot 138 versus the technologies provided by the on-board radios 132, 134, 136 may provide greater options for acceptable service to users.

The motor vehicle 110 may transport passengers, for example children, that may use short range wireless devices 150, 152, 154, for example handheld game consoles or other portable electronic devices, that may exchange transmissions using Wi-Fi or another technology with long range wireless devices 160, 162, 164 that are not in the motor vehicle 110. The short range wireless device 150 may, for example, be engaged in a game with the long range wireless device 160 or may be playing a movie that is being streamed from a remote server. The on-board radio 132 may support Wi-Fi and may provide a Wi-Fi access point for data ingress or inflow and a Wi-Fi client for data egress or outflow. Wi-Fi is a trademark of the Wi-Fi Alliance that refers to a range of connectivity technologies including wireless local area network (WLAN) based on the Institute of Electrical and Electronics Engineers (IEEE) 802.11 set of standards. The connection manager component 130 may manipulate Wi-Fi functionality provided by the on-board radio 132 depending on the type of traffic being received or transmitted by the communications control device 120. The connection manager component 130 also may use the Wi-Fi functionality provided by the on-board radio 132 if the connection manager component 130 detects that the portable communications device 140 is presently attached to the express slot 138 and further determines that the quality of service provided by the portable communications device 140 is preferable to other options.

The portable communications device 140 communicates with the communications control device 120 using Wi-Fi and may translate a Wi-Fi message received from the communications control device 120 into a medium based on a more advanced technology. The portable communications device 120 may conversely translate a message received using the advanced technology into a Wi-Fi message for handling by the communications control device 120. The portable communications device 140 may comprise two radio components, one for Wi-Fi and the other for the more advanced technology. The portable communications device 140 may use the two radios to effectively bridge messages between the established Wi-Fi technology and the more advanced technologies that may not be in service or existent at the time the communications control device 120 is installed into the motor vehicle 110.

The on-board radio 134 may be a Bluetooth device. A user of the short range wireless device 150 traveling in the motor vehicle 110 may use a Bluetooth headset or other Bluetooth device to engage in voice telephone calls. The on-board radio 134 may support Bluetooth transmissions wherein a Bluetooth Personal Area Network (PAN) profile may be used that may allow the use of Bluetooth network encapsulation protocol (NEP) for transport over a Bluetooth link. The on-board radio 134 may support Bluetooth transmissions wherein a Bluetooth Dial-up Networking (DUN) profile provides a standard to access the Internet and other dial-up services over Bluetooth. Non profile-related Bluetooth transmissions may be routed through the switch component 131 to the head unit 115 in the motor vehicle 110 for handling there. The on-board radio 134 and the connection manager component 130 may facilitate the establishment of Bluetooth pairings that promote Bluetooth communication.

The on-board radio 136 may be used to transmit traffic using the International Mobile Telecommunications-2000 (IMT-2000) technology, also known as 3G technology. The technology also may be characterized as evolution data optimized (EVDO). When the long range wireless device 160 is to receive a transmission forwarded by the communications control device 120 and the long range wireless device 160 may be contacted using 3G, the connection manager component 130 may use the on-board radio 136 for this transmission. When the long range wireless device 160 is using 3G and the communications control device 120 detects that the portable communications device 140 is presently connected to the express slot 138 and determines that the portable communications device 140 may be of a preferable technology to 3G or may otherwise be better suited to transmit to the long range wireless device 160, the communications control device 120 may opt to transmit using the portable communications device 140. The connection manager component 130 may make the decision to use the on-board radio 136 or the portable communications device 140 based on factors such as the transmission speeds offered by each device, respective transmission costs, and the signal strength exhibited by each device. The connection manager component 130 also may choose one device over another based on detecting a low power level for one of the devices. The connection manager component 130 may use a weighting system or algorithm to arrive at a final decision or may consult a stored policy that may describe when to use the on-board radio 136 and when to use the portable communications device 140.

The motor vehicle 110 may have a useful life of as many as fifteen years. When the motor vehicle 110 may be new and the communications control device 120 is initially installed in the motor vehicle 110, the on-board radios 132, 134, 136 may be state-of-the-art in terms of their technologies, service capabilities, and nontechnical factors such as operating cost or revenue potential, for example. However, during the relatively long life of the motor vehicle 110, a plurality of technical advances may occur in the fields of wireless and other communications. After several years, the technologies upon which the on-board radios 132, 134, 136 are based may no longer be current. Other more advanced technologies may have emerged and various devices based on those technologies, for example the portable communications device 140, may be available.

Wireless communications have evolved over a succession of generations. The advanced mobile phone system (AMPS) was a first-generation analog mobile phone system cellular technology. It used separate frequencies, or channels, for each conversation and required considerable bandwidth. Advanced mobile phone system (AMPS) did not provide security and did not support data communications. Second generation wireless communications embodied code division multiple access (CDMA) channel access technologies. Interim standard 95 (IS-95) was one of the early code division multiple access (CDMA)-based digital cellular standards. Second generation wireless communications also comprised global system for mobile communications (GSM) technology devices. Second generation wireless communications may not have supported data communications but were digital technologies and were more secure than previous technologies. Third generation devices currently support a plurality of types of data transmission including text, audio, and video content and provide considerably more functionality and processing power than previous devices. The evolution of wireless communications and the devices that provide these communications will naturally continue into the future. The present disclosure teaches a system and methods for bridging from older, established technologies such as Wi-Fi to advanced technologies that may not be available when the communications control device 120 is installed in the motor vehicle 110.

The express slot 138 may accommodate the portable communications device 140 and may not provide a physical communications or electrical connection to the portable communications device 140. In other words, the express slot 138, in an embodiment, may hold the portable communications device 140 securely to reduce the chances that the portable communications device 140 may fall over, slide around on a console, possibly becoming lost and/or being damaged; and in this embodiment, the express slot 138 may not provide any electrical connectivity to the portable communications device 140. The express slot 138 may promote the communications control device 120 to communicate wirelessly with the portable communications device 140 using Wi-Fi. The express slot 138 may alternatively have a physical connection or "pinout" such as provided by the peripheral component interconnect express, also known as PCI Express or PCIE, or may have a different physical connection that may accommodate the portable communications device 140. In an embodiment, the express slot 138 may supply power and physical stability to the portable communications device 140.

The portable communications device 140 may be based on the 4G technology that is a successor to the 3G technology. The express slot 138 may access the Wi-Fi access point associated with the on-board radio 132. The present disclosure teaches that because the express slot 138 accesses a Wi-Fi access point provided by the communications control device 120 and because Wi-Fi is a well known and established technology, the express slot 138 may provide access to a plurality of generations of future wireless devices, including the portable communications device 140. Because Wi-Fi is established and widely used, it also may provide backwards compatibility for future portable communications devices 140 that may feature presently unknown technologies for their primary operability but also support Wi-Fi.

In an embodiment, the portable communications device 140 may not be based on the 4G technology and may be based on another technology. In an embodiment, the technology upon which the portable communications device 140 is based may not be more advanced than that of the on-board radio 136 using the 3G technology but may be preferable based on other factors. The portable communications device 140 may exhibit stronger signal strength or clarity than the on-board radio 136. The portable communications device 140 may be operable at a lower cost than the on-board radio 136 or may present more attractive revenue generation opportunities for a telecommunication service provider, a rental car company, or other provider of services associated with the communications control device 120.

The connection manager component 130, in addition to detecting the presence of the portable communications device 140 attached to the express slot 138, also may determine whether adequate electric power is available to the express slot 138 to meet the needs of the external radio 138 and other components of the system 100. If the motor vehicle 110 does not supply adequate electric power to the express slot 138, the connection manager component 130 may not select the portable communications device 140 when it is present in the express slot 138 even if the portable communications device 140 is otherwise preferred to the on-board radio 136 or alternative components. The express slot 138 also may be designed to minimize the amount of physical movement and shock experienced by the portable communications device 140 when it is attached to the express slot 138.

The connection manager component 130 may periodically poll to determine if the portable communications device 140 is installed. The connection manager component 130 may alternatively contact the express slot 138 when a transmission to one of the long range wireless devices 160, 162, 164 is to be sent. The connection manager component 130 may use another method to determine the presence of the portable communications device 140 attached to the express slot 138.

The communications control device 120 also provides the functionality of turning off and turning on the Wi-Fi access point provided in the motor vehicle 110 when the communications control device 120 detects a signal strength of the first stationary wireless access point 170. The first stationary wireless access point 170 may be situated in a building or other structure that may be a home or office, for example. The present disclosure teaches that the first stationary wireless access point 170 and the Wi-Fi access point provided as part of the on-board radio 132 may be configured to use the same service set identifier (SSID). The motor vehicle 110 may be in operation and the short range wireless device 150 may be in use in the motor vehicle 110. The short range wireless device 150 may be used to play a game with the long range wireless device 160 wherein the long range wireless device 160 is not in the motor vehicle 110. The connection manager component 130 may route the traffic between the short range wireless device 150 and the long range wireless device 160 through the on-board radio 132 using its Wi-Fi functionality.

In an example, the first stationary wireless access point 170 may be situated in the residence of the person(s) transported in the motor vehicle 110. The person(s) may be playing the game on the short range wireless device 150 interactively with the long range wireless device 160 located elsewhere. When the motor vehicle 110 nears the residence of the person(s) transported in the motor vehicle 110, the connection manager component 130 may detect the presence of the first stationary wireless access point 170 and turn off the Wi-Fi access point provided by the on-board radio 132 in the motor vehicle 110. The connection manager component 130 may turn off the Wi-Fi access point in the motor vehicle 110 when the connection manager component 130 determines that the signal strength of the first stationary wireless access point 170 exceeds a predetermined level. The Wi-Fi access point in the motor vehicle 110 may be turned off at this point because the connection manager component 130 prefers that short range wireless devices 150, 152, 154 exchange transmissions with the first stationary wireless access point 170. The first stationary wireless access point 170 may be preferable to the Wi-Fi access point in the motor vehicle 110 because it has access to greater and more reliable electric power and may contain functionality for boosting signal strength. The first stationary wireless access point 170 also may provide functionality for connecting to other devices in the home, including devices that may support standards issued by the Digital Living Network Alliance (DLNA). The signal strength of the first stationary wireless access point 170 may become increasingly greater as the motor vehicle 110 nears the residence wherein the first stationary wireless access point 170 is situated. Once the signal strength of the first stationary wireless access point 170 exceeds the predetermined level, and the connection manager component 130 turns off the Wi-Fi access point in the motor vehicle 110, the short range wireless device 150 may commence transmitting and receiving with the first stationary wireless access point 170. This occurs because the Wi-Fi access point in the motor vehicle 110 and the first stationary wireless access point 170 share the same service set identifier (SSID). The connection manager component 130 is configured to allow the first stationary wireless access point 170 to effectively take precedence over the Wi-Fi access point in the motor vehicle 110. When the signal strength of the first stationary wireless access point 170 is detected to exceed the predetermined level, the connection manager component 130 turns off the Wi-Fi access point in the motor vehicle 110, and the short range wireless device 150 commences transmissions with the first stationary wireless access point 170. The transition of access points may not be apparent to the users of the short range wireless device 150 and long range wireless device 160.

A similar scenario may take place when the sequence of events described above occurs in reverse order. A user of the short range wireless device 150 may be physically situated in a residential, commercial, or other structure. The short range wireless device 150 may be engaged in an active session with the long range wireless device 160 and may be transmitting via the first stationary wireless access point 170. The user may enter the motor vehicle 110 and travel away from the first stationary wireless access point 170. While the motor vehicle 110 is still relatively close to the first stationary wireless access point 170, the short range wireless device 150 may still transmit with the first stationary wireless access point 170. Once the motor vehicle 110 reaches a point where the signal strength of the first stationary wireless access point 170 drops below the predetermined threshold, the connection manager component 130 may then cause the Wi-Fi access point in the motor vehicle 110 to switch on and begin transmitting for the short range wireless device 150. As previously stated, these actions may occur without the knowledge of the user of the short range wireless device 150. The connection manager component 130 performs the monitoring of Wi-Fi signal strength of various Wi-Fi devices and additionally monitors their service set identifiers (SSID) as the motor vehicle 110 moves.

Whether the connection manager component 130 causes the Wi-Fi access point associated with the on-board radio 132 in the motor vehicle 110 to be in switched-on or switched-off state may be a function of signal strength of the first stationary wireless access point 170 and not a function of physical distance from the first stationary wireless access point 170. For example, the motor vehicle 110 may be physically proximate to the first stationary wireless access point 170 but the signal strength of the first stationary wireless access point 170 detected by the connection manager component 130 may not be strong because the signal is obstructed by a wall, a building, or other physical object or by signal interference. The connection manager component 130 may not switch off the Wi-Fi access point in the vehicle until the connection manager component 130 determines that the received signal strength of the first stationary wireless access point 170 is at the predetermined level and is likely to remain at or above the predetermined level for a foreseeable period of time.

The connection manager component 130 also exchanges signals with the second stationary wireless access point 180. The second stationary wireless access point 180 may be physically located on or proximate to the premises of an establishment that performs maintenance on the motor vehicle 110, for example an automobile dealership. The connection manager component 130 may detect that the received signal strength of the second stationary wireless access point 180 has exceeded a second predetermined level. This may indicate that the motor vehicle 110 has moved proximate to the second stationary wireless access point 180, for example onto the premises of the automobile service establishment. The connection manager component 130 may determine from the Wi-Fi signal that the motor vehicle 110 is proximate to the second stationary wireless access point 180 and may identify the source of the signal as the service establishment. The connection manager component 130 may identity the service set identifier (SSID) contained in the signal as that of the service establishment and may then begin to accept messages from the service establishment.

Upon receiving a message from the second stationary wireless access point 180 situated at the service establishment, the connection manager component 130 may access a stored policy associated with the service establishment. The stored policy may direct the connection manager component 130 to cause the motor vehicle 110 to send information to the service establishment. Such information may comprise the vehicle identification number (VIN) of the motor vehicle 110, the odometer reading of the motor vehicle 110, and selected diagnostic information associated with the motor vehicle 110. In an embodiment, a transmission control unit (TCU) may be installed in the motor vehicle 110. The transmission control unit (TCU) may work with an engine control unit (ECU) installed in the motor vehicle 110. The transmission control unit (TCU) and the engine control unit (ECU) may use a plurality of sensors to gather a plurality of information about the motor vehicle 110, including diagnostic information. The connection manager component 130 may cause this information to be gathered and transmitted to the second stationary wireless access point 180 via the Wi-Fi functionality of the on-board radio 132. This information, when received and processed by the service establishment, may be useful in diagnosing problems and performing maintenance on the motor vehicle 110.

The Wi-Fi capabilities of the communications control device 120 and its components may be subject to the Wi-Fi Protected Setup (WPS), a standard for establishment of a wireless network created by the Wi-Fi Alliance. In an embodiment, the head unit 115 may support standards issued by the Digital Living Network Alliance (DLNA) related to the transmission and sharing of digital images, music, and other media between different types of electronic devices.

The base transceiver stations (BTS) 190, 192 may be any of cellular wireless base transceiver stations, for example Code Division Multiple Access (CDMA), Global System for Mobile Communications (GSM), Universal Mobile Telecommunications System (UMTS), and/or Long-term Evolution (LTE) cellular wireless base transceiver stations; Worldwide Interoperable Microwave Access (WiMAX) base transceiver stations; WiFi access points; femtocells; or other wireless access devices.

The network 194 promotes communication between the components of the system 100. The network 194 may be any communication network including a public data network (PDN), a public switched telephone network (PSTN), a private network, and/or a combination thereof.

The long range wireless devices 160, 162, 164 may be mobile telephones, game consoles with internet or other long range connectivity, tablet computers, laptop computers, or other portable computers or portable electronic devices. Long range wireless devices 160, 162, 164 and short range wireless devices 150, 152, 154 are described in detail hereinafter.

The desktop computer 196 may be located in a home, in an office, or another site and may exchange transmissions with the short range wireless devices 150, 152, 154 while the short range wireless devices 150, 152, 154 are in the motor vehicle 110 distant from the desktop computer 196 or located proximate to the desktop computer 196. The desktop computer 196 may share media content with the short range wireless devices 150, 152, 154 and may share the media content in observance of standards issued by the Digital Living Network Alliance (DLNA).

The content server 198 may be located in a home, in an office, or another site and may make digital media content available to the short range wireless devices 150, 152, 154 while the short range wireless devices 150, 152, 154 are in the motor vehicle 110 distant from the content server 198 or located proximate to the content server 198. The content server 198 may provide media content to the short range wireless devices 150, 152, 154 and may provide the media content in observance of standards issued by the Digital Living Network Alliance (DLNA).

Figure 2:
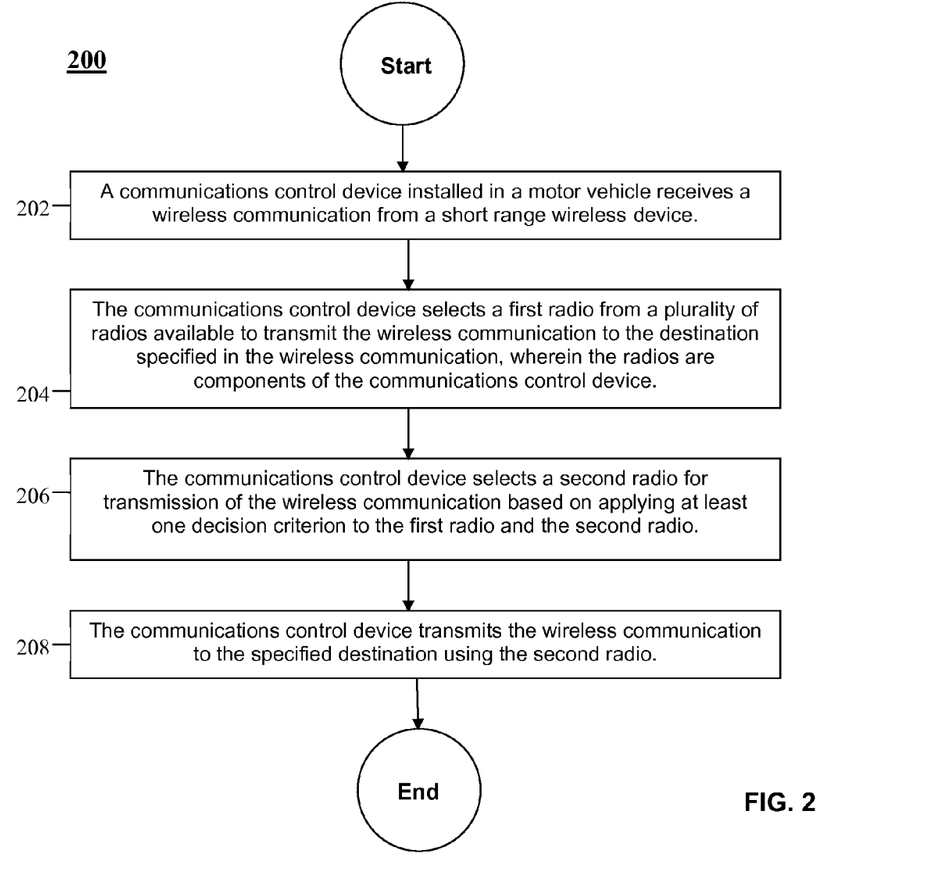
FIG. 2 is a flow chart illustrating a method according to an embodiment of the disclosure.

Turning now to FIG. 2, a processor-implemented method 200 is provided. Beginning at block 202, a communications control device installed in a motor vehicle receives a wireless communication from a short range wireless device. At block 204, the communications control device selects a first radio from a plurality of radios available to transmit the wireless communication to the destination specified in the wireless communication, wherein the radios are components of the communications control device.

At block 206, the communications control device selects a second radio for transmission of the wireless communication based on applying at least one decision criterion to the first radio and the second radio. At block 208, the communications control device transmits the wireless communication to the specified destination using the second radio.

Figure 3:
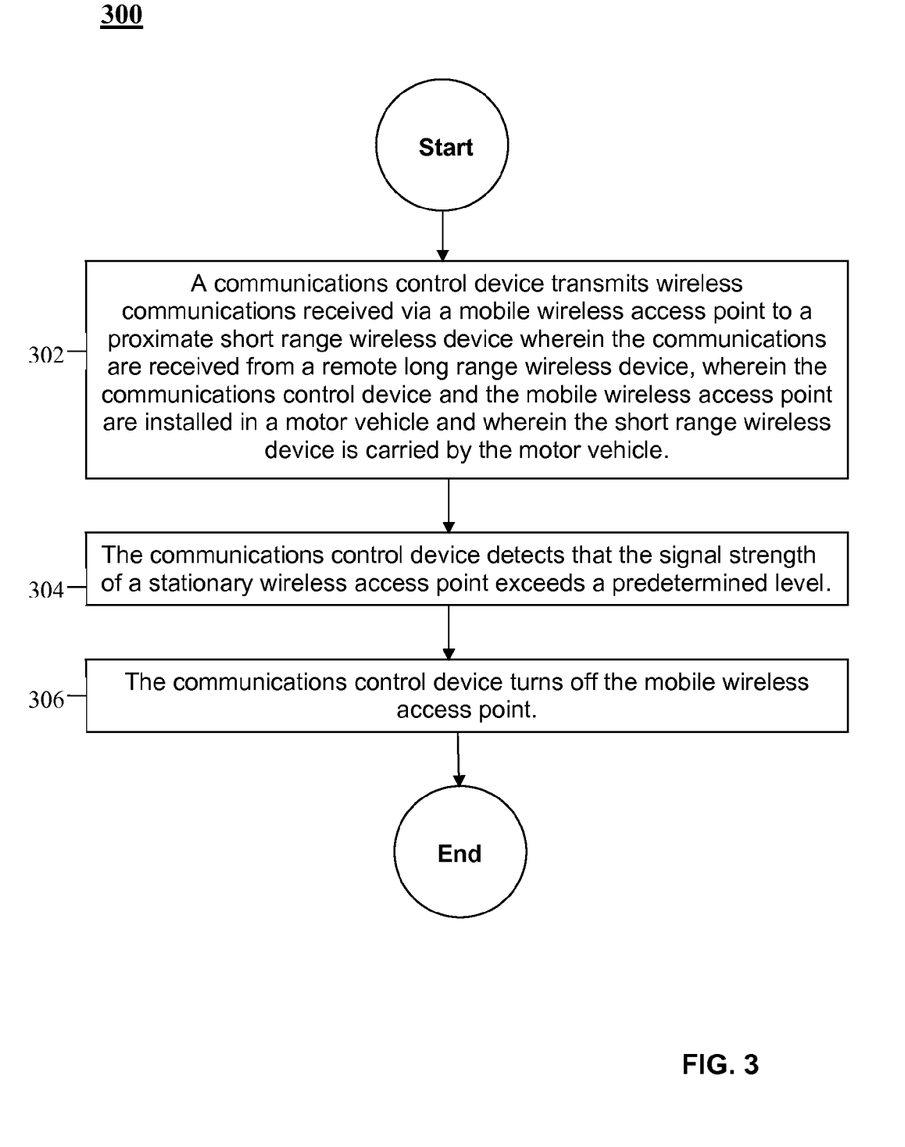
FIG. 3 is a flow chart illustrating a method according to an embodiment of the disclosure.

Turning now to FIG. 3, a processor-implemented method 300 is provided. Beginning at block 302, a communications control device transmits wireless communications received via a mobile wireless access point to a proximate short range wireless device, wherein the communications are received from a remote long range wireless device, wherein the communications control device and the mobile wireless access point are installed in a motor vehicle and wherein the short range wireless device is carried by the motor vehicle.

At block 304, the communications control device detects that the signal strength of a stationary wireless access point exceeds a predetermined level. At block 306, the communications control device turns off the mobile wireless access point.

Figure 4:
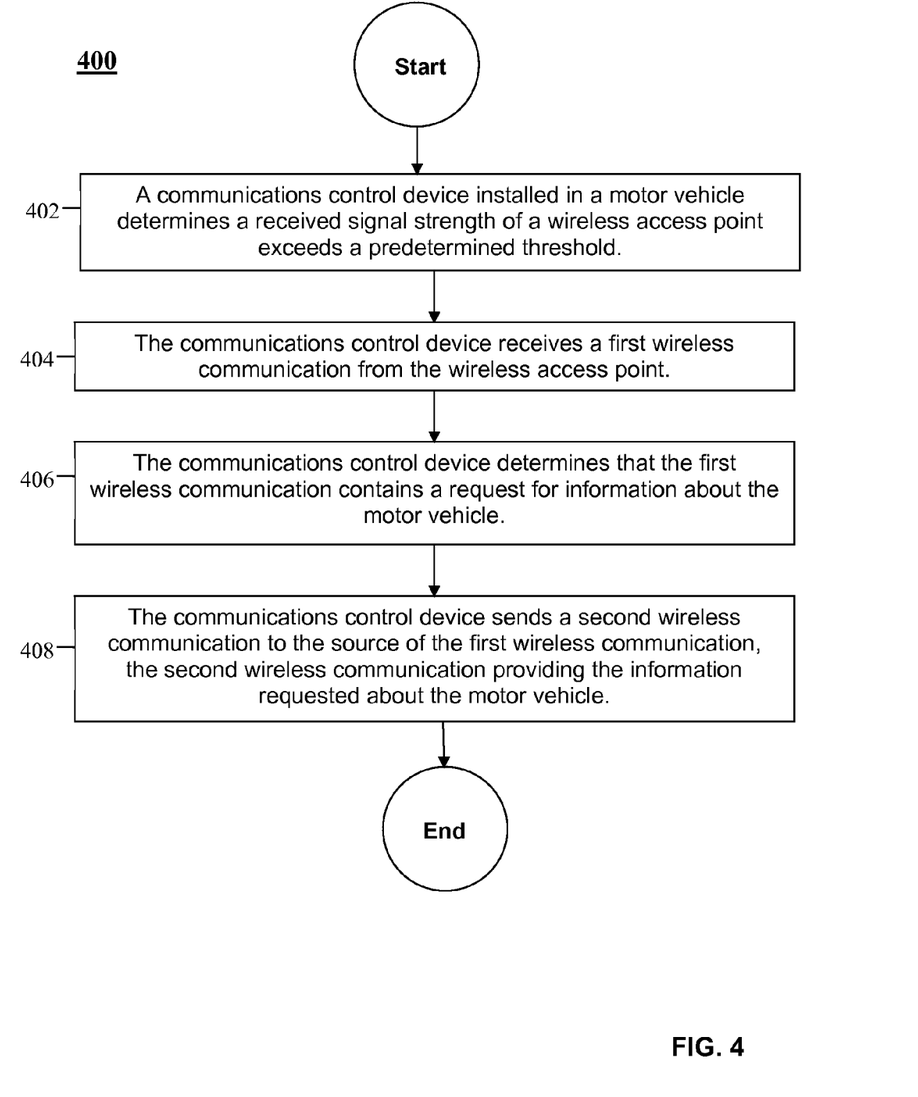
FIG. 4 is a flow chart illustrating a method according to an embodiment of the disclosure.

Turning now to FIG. 4, a processor-implemented method 400 is provided. Beginning at block 402, a communications control device installed in a motor vehicle determines a received signal strength of a wireless access point exceeds a predetermined threshold. At block 404, the communications control device receives a first wireless communication from the wireless access point.

At block 406, the communications control device determines that the first wireless communication contains a request for information about the motor vehicle. At block 408, the communications control device sends a second wireless communication to the source of the first wireless communication, the second wireless communication providing the information requested about the motor vehicle.

Figure 5:
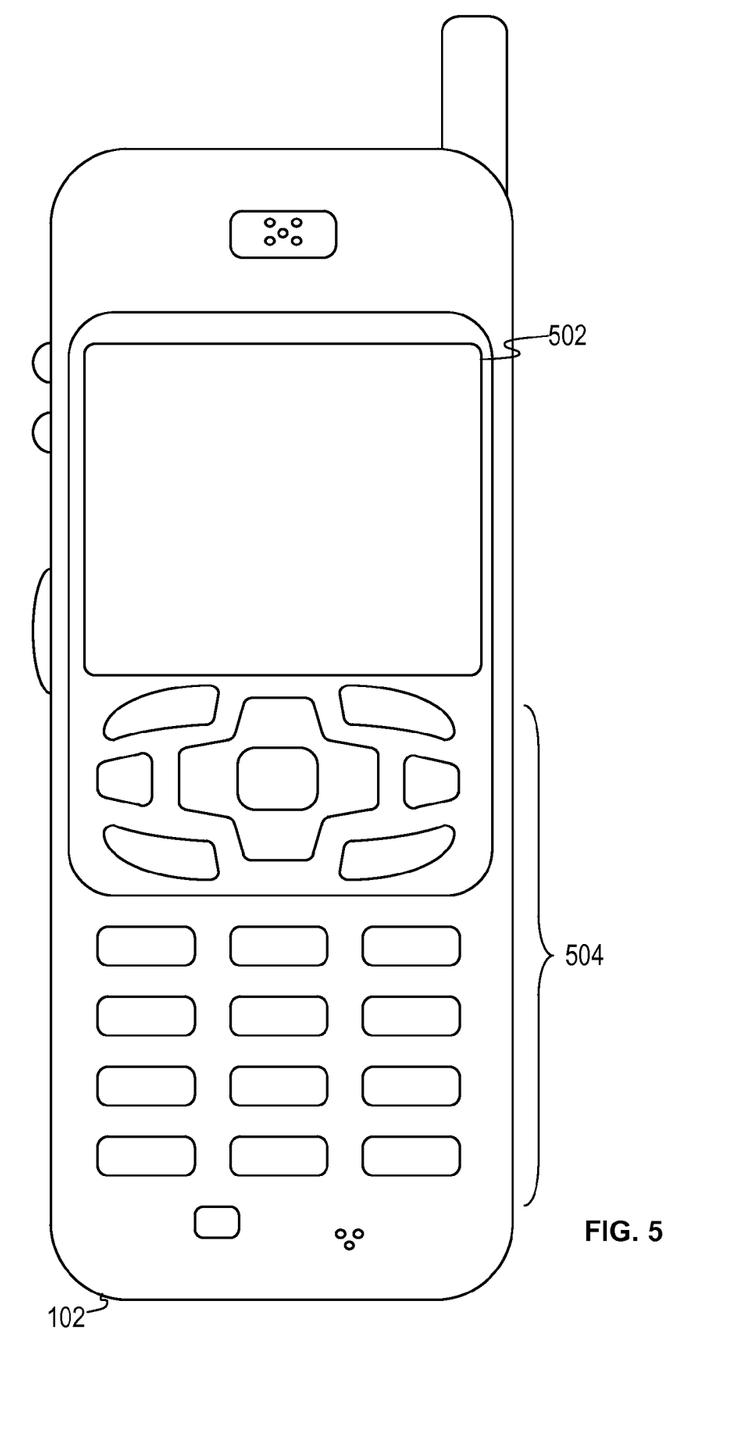
FIG. 5 is an illustration of a mobile device according to an embodiment of the disclosure.

FIG. 5 shows a wireless communications system including the mobile device 102. FIG. 5 depicts the mobile device 102, which is operable for implementing aspects of the present disclosure, but the present disclosure should not be limited to these implementations. The mobile device 102 may in some embodiments exemplify the short range wireless devices 150, 152, 154 and the long range wireless devices 160, 162, 164 described in the system 100. Though illustrated as a mobile phone, the mobile device 102 may take various forms including a wireless handset, a pager, a personal digital assistant (PDA), a gaming device, an inventory control device, a media player, a digital camera, a digital calculator, a portable computer, a tablet computer, a laptop computer, and/or other. Many suitable handsets combine some or all of these functions. In some embodiments of the present disclosure, the mobile device 102 is not a general purpose computing device like a portable, laptop or tablet computer, but rather is a special-purpose communications device such as a mobile phone, wireless handset, pager, or PDA. The mobile device 102 may support specialized activities such as gaming, inventory control, job control, and/or task management functions, and so on.

The mobile device 102 includes a display 502 and a touch-sensitive surface and/or keys 504 for input by a user. The mobile device 102 may present options for the user to select, controls for the user to actuate, and/or cursors or other indicators for the user to direct. The mobile device 102 may further accept data entry from the user, including numbers to dial or various parameter values for configuring the operation of the handset. The mobile device 102 may further execute one or more software or firmware applications in response to user commands. These applications may configure the mobile device 102 to perform various customized functions in response to user interaction. Additionally, the mobile device 102 may be programmed and/or configured over-the-air, for example from a wireless base station, a wireless access point, or a peer mobile device 102.

The mobile device 102 may execute a web browser application which enables the display 502 to show a web page. The web page may be obtained via wireless communications with the base transceiver station (BTS) 190 described in the system 100, a wireless network access node, a peer mobile device 102 or any other wireless communication network or system. While a single base transceiver station 190 is illustrated in FIG. 1, it is understood that the wireless communication system may comprise additional base transceiver stations 190. In some instances, the mobile device 102 may be in communication with multiple base transceiver stations 190 at the same time. The base transceiver station 190 (or wireless network access node) is coupled to a wired network such as the Internet. Via a wireless link and a wired network, the mobile device 102 has access to information on various servers. Servers may provide content that may be shown on the display 502. Alternately, the mobile device 102 may access the base transceiver station 190 described in the system 100 through a peer mobile device 102 acting as an intermediary, in a relay type or hop type of connection.

Figure 6:
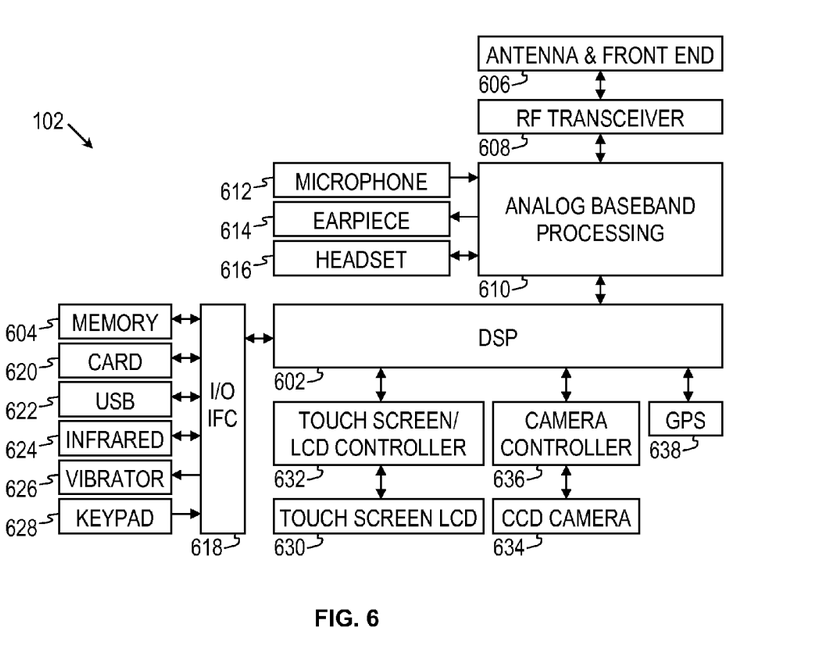
FIG. 6 is a block diagram of a mobile device according to an embodiment of the disclosure.

FIG. 6 shows a block diagram of the mobile device 102. While a variety of known components of handsets 102 are depicted, in an embodiment a subset of the listed components and/or additional components not listed may be included in the mobile device 102. The mobile device 102 includes a digital signal processor (DSP) 602 and a memory 604. As shown, the mobile device 102 may further include an antenna and front end unit 606, a radio frequency (RF) transceiver 608, an analog baseband processing unit 610, a microphone 612, an earpiece speaker 614, a headset port 616, an input/output interface 618, a removable memory card 620, a universal serial bus (USB) port 622, an infrared port 624, a vibrator 626, a keypad 628, a touch screen liquid crystal display (LCD) with a touch sensitive surface 630, a touch screen/LCD controller 632, a charge-coupled device (CCD) camera 634, a camera controller 636, and a global positioning system (GPS) sensor 638. In an embodiment, the mobile device 102 may include another kind of display that does not provide a touch sensitive screen. In an embodiment, the DSP 602 may communicate directly with the memory 604 without passing through the input/output interface 618.

The DSP 602 or some other form of controller or central processing unit operates to control the various components of the mobile device 102 in accordance with embedded software or firmware stored in memory 604 or stored in memory contained within the DSP 602 itself. In addition to the embedded software or firmware, the DSP 602 may execute other applications stored in the memory 604 or made available via information carrier media such as portable data storage media like the removable memory card 620 or via wired or wireless network communications. The application software may comprise a compiled set of machine-readable instructions that configure the DSP 602 to provide the desired functionality, or the application software may be high-level software instructions to be processed by an interpreter or compiler to indirectly configure the DSP 602.

The antenna and front end unit 606 may be provided to convert between wireless signals and electrical signals, enabling the mobile device 102 to send and receive information from a radio access network (RAN) or some other available wireless communications network or from a peer mobile device 102. In an embodiment, the antenna and front end unit 606 may include multiple antennas to support beam forming and/or multiple input multiple output (MIMO) operations. As is known to those skilled in the art, MIMO operations may provide spatial diversity which can be used to overcome difficult channel conditions and/or increase channel throughput. The antenna and front end unit 606 may include antenna tuning and/or impedance matching components, RF power amplifiers, and/or low noise amplifiers.

The RF transceiver 608 provides frequency shifting, converting received RF signals to baseband and converting baseband transmit signals to RF. In some descriptions a radio transceiver or RF transceiver may be understood to include other signal processing functionality such as modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions. For the purposes of clarity, the description here separates the description of this signal processing from the RF and/or radio stage and conceptually allocates that signal processing to the analog baseband processing unit 610 and/or the DSP 602 or other central processing unit. In some embodiments, the RF transceiver 608, portions of the antenna and front end unit 606, and the analog baseband processing unit 610 may be combined in one or more processing units and/or application specific integrated circuits (ASICs).

The analog baseband processing unit 610 may provide various analog processing of inputs and outputs, for example analog processing of inputs from the microphone 612 and the headset port 616 and outputs to the earpiece speaker 614 and the headset port 616. To that end, the analog baseband processing unit 610 may have ports for connecting to the built-in microphone 612 and the earpiece speaker 614 that enable the mobile device 102 to be used as a mobile phone. The analog baseband processing unit 610 may further include a port for connecting to a headset or other hands-free microphone and speaker configuration. The analog baseband processing unit 610 may provide digital-to-analog conversion in one signal direction and analog-to-digital conversion in the opposing signal direction. In some embodiments, at least some of the functionality of the analog baseband processing unit 610 may be provided by digital processing components, for example by the DSP 602 or by other central processing units.

The DSP 602 may perform modulation/demodulation, coding/decoding, interleaving/deinterleaving, spreading/despreading, inverse fast Fourier transforming (IFFT)/fast Fourier transforming (FFT), cyclic prefix appending/removal, and other signal processing functions associated with wireless communications. In an embodiment, for example in a code division multiple access (CDMA) technology application, for a transmitter function the DSP 602 may perform modulation, coding, interleaving, and spreading, and for a receiver function the DSP 602 may perform despreading, deinterleaving, decoding, and demodulation. In another embodiment, for example in an orthogonal frequency division multiplex access (OFDMA) technology application, for the transmitter function the DSP 602 may perform modulation, coding, interleaving, inverse fast Fourier transforming, and cyclic prefix appending, and for a receiver function the DSP 602 may perform cyclic prefix removal, fast Fourier transforming, deinterleaving, decoding, and demodulation. In other wireless technology applications, yet other signal processing functions and combinations of signal processing functions may be performed by the DSP 602.

The DSP 602 may communicate with a wireless network via the analog baseband processing unit 610. In some embodiments, the communication may provide internet connectivity, enabling a user to gain access to content on the Internet and to send and receive e-mail or text messages. The input/output interface 618 interconnects the DSP 602 and various memories and interfaces. The memory 604 and the removable memory card 620 may provide software and data to configure the operation of the DSP 602. Among the interfaces may be the USB port 622 and the infrared port 624. The USB port 622 may enable the mobile device 102 to function as a peripheral device to exchange information with a personal computer or other computer system. The infrared port 624 and other optional ports such as a Bluetooth interface or an IEEE 802.11 compliant wireless interface may enable the mobile device 102 to communicate wirelessly with other nearby handsets and/or wireless base stations.

The input/output interface 618 may further connect the DSP 602 to the vibrator 626 that, when triggered, causes the mobile device 102 to vibrate. The vibrator 626 may serve as a mechanism for silently alerting the user to any of various events such as an incoming call, a new text message, and an appointment reminder.

The keypad 628 couples to the DSP 602 via the interface 618 to provide one mechanism for the user to make selections, enter information, and otherwise provide input to the mobile device 102. Another input mechanism may be the touch screen LCD 630, which also may display text and/or graphics to the user. The touch screen LCD controller 632 couples the DSP 602 to the touch screen LCD 630.

The CCD camera 634 enables the mobile device 102 to take digital pictures. The DSP 602 communicates with the CCD camera 634 via the camera controller 636. The GPS sensor 638 is coupled to the DSP 602 to decode global positioning system signals, thereby enabling the mobile device 102 to determine its position. In another embodiment, a camera operating according to a technology other than charge coupled device cameras may be employed. Various other peripherals also may be included to provide additional functions, e.g., radio and television reception.

Figure 7:
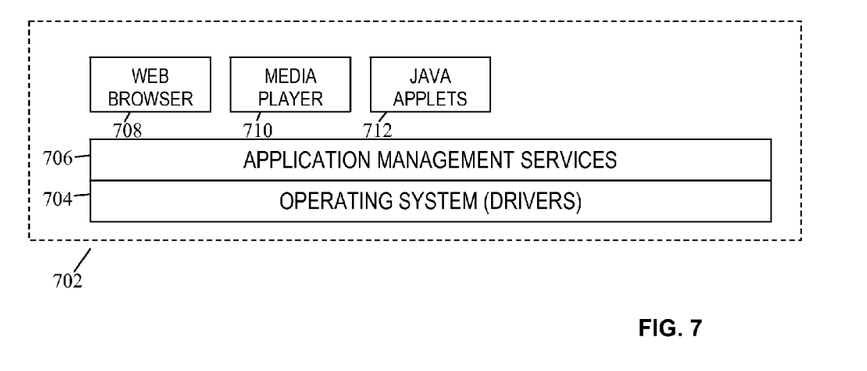
FIG. 7 is a block diagram of a software architecture for a mobile device according to an embodiment of the disclosure.

FIG. 7 illustrates a software environment 702 that may be implemented by the DSP 602. The DSP 602 executes operating system software 704 that provides a platform from which the rest of the software operates. The operating system software 704 may provide a variety of drivers for the handset hardware with standardized interfaces that are accessible to application software. The operating system software 704 may be coupled to and interact with application management services ("AMS") 706 that transfer control between applications running on the mobile device 102. Also shown in FIG. 7 are a web browser application 708, a media player application 710, and JAVA applets 712. The web browser application 708 configures the mobile device 102 to operate as a web browser, allowing a user to enter information into forms and select links to retrieve and view web pages. The media player application 710 configures the mobile device 102 to retrieve and play audio or audiovisual media. The JAVA applets 712 configure the mobile device 102 to provide games, utilities, and other functionality.

Figure 8:
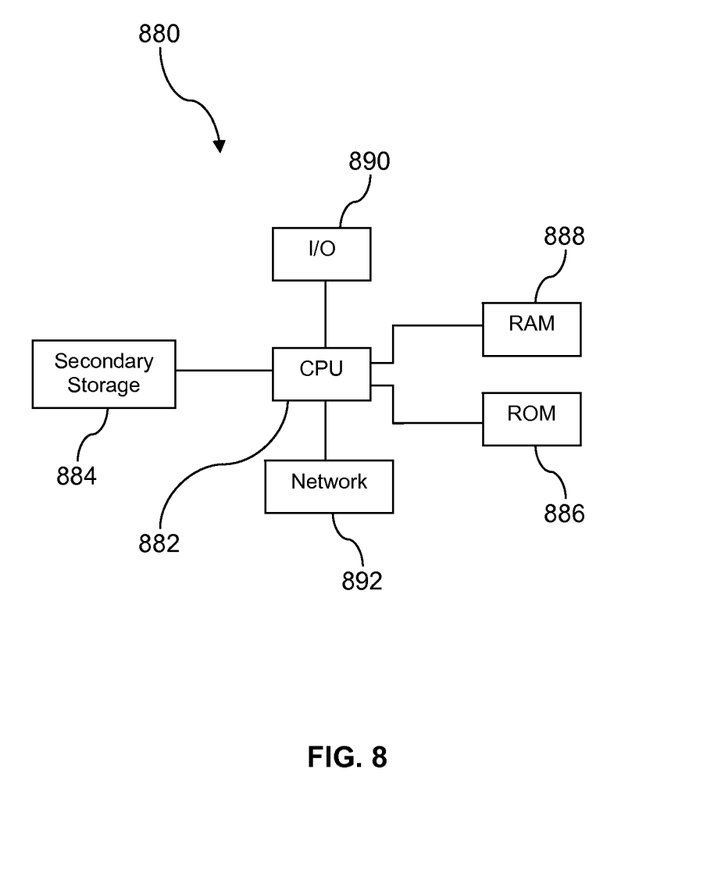
FIG. 8 illustrates an exemplary computer system suitable for implementing some aspects of the several embodiments of the disclosure.

FIG. 8 illustrates a computer system 880 suitable for implementing one or more embodiments disclosed herein. The computer system 880 includes a processor 882 (which may be referred to as a central processor unit or CPU) that is in communication with memory devices including secondary storage 884, read only memory (ROM) 886, random access memory (RAM) 888, input/output (I/O) devices 890, and network connectivity devices 892. The processor 882 may be implemented as one or more CPU chips.

It is understood that by programming and/or loading executable instructions onto the computer system 880, at least one of the CPU 882, the RAM 888, and the ROM 886 are changed, transforming the computer system 880 in part into a particular machine or apparatus having the novel functionality taught by the present disclosure. It is fundamental to the electrical engineering and software engineering arts that functionality that can be implemented by loading executable software into a computer can be converted to a hardware implementation by well known design rules. Decisions between implementing a concept in software versus hardware typically hinge on considerations of stability of the design and numbers of units to be produced rather than any issues involved in translating from the software domain to the hardware domain. Generally, a design that is still subject to frequent change may be preferred to be implemented in software, because re-spinning a hardware implementation is more expensive than re-spinning a software design. Generally, a design that is stable that will be produced in large volume may be preferred to be implemented in hardware, for example in an application specific integrated circuit (ASIC), because for large production runs the hardware implementation may be less expensive than the software implementation. Often a design may be developed and tested in a software form and later transformed, by well known design rules, to an equivalent hardware implementation in an application specific integrated circuit that hardwires the instructions of the software. In the same manner as a machine controlled by a new ASIC is a particular machine or apparatus, likewise a computer that has been programmed and/or loaded with executable instructions may be viewed as a particular machine or apparatus.

The secondary storage 884 is typically comprised of one or more disk drives or tape drives and is used for non-volatile storage of data and as an over-flow data storage device if RAM 888 is not large enough to hold all working data. Secondary storage 884 may be used to store programs which are loaded into RAM 888 when such programs are selected for execution. The ROM 886 is used to store instructions and perhaps data which are read during program execution. ROM 886 is a non-volatile memory device which typically has a small memory capacity relative to the larger memory capacity of secondary storage 884. The RAM 888 is used to store volatile data and perhaps to store instructions. Access to both ROM 886 and RAM 888 is typically faster than to secondary storage 884. The secondary storage 884, the RAM 888, and/or the ROM 886 may be referred to in some contexts as non-transitory storage and/or non-transitory computer readable media.

I/O devices 890 may include printers, video monitors, liquid crystal displays (LCDs), touch screen displays, keyboards, keypads, switches, dials, mice, track balls, voice recognizers, card readers, paper tape readers, or other well-known input devices.

The network connectivity devices 892 may take the form of modems, modem banks, Ethernet cards, universal serial bus (USB) interface cards, serial interfaces, token ring cards, fiber distributed data interface (FDDI) cards, wireless local area network (WLAN) cards, radio transceiver cards such as code division multiple access (CDMA), global system for mobile communications (GSM), long-term evolution (LTE), worldwide interoperability for microwave access (WiMAX), and/or other air interface protocol radio transceiver cards, and other well-known network devices. These network connectivity devices 892 may enable the processor 882 to communicate with the Internet or one or more intranets. With such a network connection, it is contemplated that the processor 882 might receive information from the network, or might output information to the network in the course of performing the above-described method steps. Such information, which is often represented as a sequence of instructions to be executed using processor 882, may be received from and outputted to the network, for example, in the form of a computer data signal embodied in a carrier wave.

Such information, which may include data or instructions to be executed using processor 882 for example, may be received from and outputted to the network, for example, in the form of a computer data baseband signal or signal embodied in a carrier wave. The baseband signal or signal embodied in the carrier wave generated by the network connectivity devices 892 may propagate in or on the surface of electrical conductors, in coaxial cables, in waveguides, in an optical conduit, for example an optical fiber, or in the air or free space. The information contained in the baseband signal or signal embedded in the carrier wave may be ordered according to different sequences, as may be desirable for either processing or generating the information or transmitting or receiving the information. The baseband signal or signal embedded in the carrier wave, or other types of signals currently used or hereafter developed, may be generated according to several methods well known to one skilled in the art. The baseband signal and/or signal embedded in the carrier wave may be referred to in some contexts as a transitory signal.

The processor 882 executes instructions, codes, computer programs, scripts which it accesses from hard disk, floppy disk, optical disk (these various disk based systems may all be considered secondary storage 884), ROM 886, RAM 888, or the network connectivity devices 892. While only one processor 882 is shown, multiple processors may be present. Thus, while instructions may be discussed as executed by a processor, the instructions may be executed simultaneously, serially, or otherwise executed by one or multiple processors. Instructions, codes, computer programs, scripts, and/or data that may be accessed from the secondary storage 884, for example, hard drives, floppy disks, optical disks, and/or other device, the ROM 886, and/or the RAM 888 may be referred to in some contexts as non-transitory instructions and/or non-transitory information.

In an embodiment, the computer system 880 may comprise two or more computers in communication with each other that collaborate to perform a task. For example, but not by way of limitation, an application may be partitioned in such a way as to permit concurrent and/or parallel processing of the instructions of the application. Alternatively, the data processed by the application may be partitioned in such a way as to permit concurrent and/or parallel processing of different portions of a data set by the two or more computers. In an embodiment, virtualization software may be employed by the computer system 880 to provide the functionality of a number of servers that is not directly bound to the number of computers in the computer system 880. For example, virtualization software may provide twenty virtual servers on four physical computers. In an embodiment, the functionality disclosed above may be provided by executing the application and/or applications in a cloud computing environment. Cloud computing may comprise providing computing services via a network connection using dynamically scalable computing resources. Cloud computing may be supported, at least in part, by virtualization software. A cloud computing environment may be established by an enterprise and/or may be hired on an as-needed basis from a third party provider. Some cloud computing environments may comprise cloud computing resources owned and operated by the enterprise as well as cloud computing resources hired and/or leased from a third party provider.

In an embodiment, some or all of the functionality disclosed above may be provided as a computer program product. The computer program product may comprise one or more computer readable storage medium having computer usable program code embodied therein implementing the functionality disclosed above. The computer program product may comprise data, data structures, files, executable instructions, and other information. The computer program product may be embodied in removable computer storage media and/or non-removable computer storage media. The removable computer readable storage medium may comprise, without limitation, a paper tape, a magnetic tape, magnetic disk, an optical disk, a solid state memory chip, for example analog magnetic tape, compact disk read only memory (CD-ROM) disks, floppy disks, jump drives, digital cards, multimedia cards, and others. The computer program product may be suitable for loading, by the computer system 880, at least portions of the contents of the computer program product to the secondary storage 884, to the ROM 886, to the RAM 888, and/or to other non-volatile memory and volatile memory of the computer system 880. The processor 882 may process the executable instructions and/or data in part by directly accessing the computer program product, for example by reading from a CD-ROM disk inserted into a disk drive peripheral of the computer system 880. The computer program product may comprise instructions that promote the loading and/or copying of data, data structures, files, and/or executable instructions to the secondary storage 884, to the ROM 886, to the RAM 888, and/or to other non-volatile memory and volatile memory of the computer system 880.

While several embodiments have been provided in the present disclosure, it should be understood that the disclosed systems and methods may be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted or not implemented.

Also, techniques, systems, subsystems, and methods described and illustrated in the various embodiments as discrete or separate may be combined or integrated with other systems, modules, techniques, or methods without departing from the scope of the present disclosure. Other items shown or discussed as directly coupled or communicating with each other may be indirectly coupled or communicating through some interface, device, or intermediate component, whether electrically, mechanically, or otherwise. Other examples of changes, substitutions, and alterations are ascertainable by one skilled in the art and could be made without departing from the spirit and scope disclosed herein.

What is claimed is:

1. A method of automotive multi-generation connectivity that enables a short range wireless device in a motor vehicle to exchange transmissions with one or more long range wireless devices not in the motor vehicle, comprising:
   receiving, by a communications control device installed in the motor vehicle, a wireless communication from the short range wireless device;
   applying, by the communications control device, at least one decision criterion to a first radio of a plurality of radios and a second radio available to transmit the wireless communication to a destination specified in the wireless communication, wherein each of the plurality of radios is a component of the communications control device, and wherein one of the plurality of radios provides a mobile access point;
   selecting, by the communications control device, the second radio for transmission of the wireless communication based on the application of the at least one decision criterion to the first radio and the second radio; and
   transmitting, by the communications control device, the wireless communication to the specified destination using the second radio;
   transmitting, by the communications control device, wireless communications received via the mobile wireless access point to the short range wireless device, wherein the wireless communications are received from a remote long range wireless device;
   detecting, by the communications control device, that a signal strength of a stationary wireless access point exceeds a predetermined level; and
   turning off, by the communications control device, the mobile wireless access point.

2. The method of claim 1, wherein the at least one decision criterion comprises comparison of transmission rate and signal strength associated with each of the first radio and the second radio.

3. The method of claim 1, wherein the communications control device comprises a connection manager device and a switch component.

4. The method of claim 3, wherein the connection manager device causes the switch component to transmit wireless traffic received from a plurality of proximate short range devices to a plurality of remote long range devices and causes the switch component to transmit wireless traffic received from the plurality of remote long range devices to the plurality of proximate short range devices.

5. The method of claim 4, wherein the proximate short range devices are transported by the motor vehicle and comprise at least one of a mobile telephone, a personal digital assistant (PDA), a media player, a laptop computer, a tablet computer, or a game player.

6. The method of claim 3, wherein the connection manager device is associated with a Wi-Fi access point.

7. The method of claim 1, wherein the wireless communication from the short range wireless device is received using WiFi technology, International Mobile Telecommunications-2000 (IMT-2000) technology, known as 3G, or Bluetooth technology.

8. The method of claim 1, wherein the communications control device determines that the second radio is connected to a physical expansion slot, wherein the physical expansion slot is a component of the communications control device, and wherein the communications control device determines the electric power of the second radio.

9. The method of claim 1, wherein the physical expansion slot provides connectivity to a long range wireless device, wherein the long range wireless device is based on a 4G technology or successor technologies, and wherein the 4G technology is a successor to a 3G technology.

10. The method of claim 1, wherein the second radio is one of the plurality of radios.

11. The method of claim 1, wherein the second radio is connected to a physical expansion slot in the motor vehicle.

12. The method of claim 1, wherein the stationary wireless access point and the mobile wireless access point are WiFi access points.

13. The method of claim 1, wherein the stationary wireless access point and the mobile wireless access point share a common service set identifier (SSID).

14. The method of claim 13, wherein a connection manager device of the communications control device determines that the service set identifier (SSID) of the stationary wireless access point and the service set identifier (SSID) of the mobile wireless access point match prior to turning off the mobile wireless access point.

15. The method of claim 1, wherein the stationary wireless access point is located in a residential or a commercial structure.

16. The method of claim 1, further comprising:
   determining, by the communications control device, that a received signal strength of a wireless access point exceeds a predetermined threshold;
   receiving, by the communications control device, a first wireless communication from the wireless access point;
   determining, by the communications control device, that the first wireless communication contains a request for information about the motor vehicle; and
   sending, by the communications control device, a second wireless communication to a source of the first wireless communication, the second wireless communication providing the information requested about the motor vehicle.

17. The method of claim 16, wherein the first wireless communication is sent by an automobile service facility.

18. The method of claim 16, wherein a connection manager device of the communications control device accesses a stored policy to determine the information to provide in the second wireless communication, and wherein the information comprises at least one of a vehicle identification number (VIN) of the motor vehicle, an odometer reading of the motor vehicle, or at least one item of diagnostic information about the motor vehicle.

19. The method of claim 16, further comprising receiving at least some of the requested information from a transmission control unit (TCU) installed in the motor vehicle.

* * * * *